(12) United States Patent
Hayashi et al.

(10) Patent No.: US 8,288,498 B2
(45) Date of Patent: Oct. 16, 2012

(54) SUGAR-ALCOHOL-MODIFIED ORGANOPOLYSILOXANE COMPOUND AND PROCESSES FOR PRODUCING THE SAME

(75) Inventors: Yoshihiro Hayashi, Kawasaki (JP); Satoshi Abe, Kawasaki (JP)

(73) Assignee: NOF Corporation, Tokyo (JP)

( * ) Notice: Subject to any disclaimer, the term of this patent is extended or adjusted under 35 U.S.C. 154(b) by 113 days.

(21) Appl. No.: 12/594,032

(22) PCT Filed: Mar. 26, 2008

(86) PCT No.: PCT/JP2008/055762
§ 371 (c)(1),
(2), (4) Date: Sep. 30, 2009

(87) PCT Pub. No.: WO2008/123318
PCT Pub. Date: Oct. 16, 2008

(65) Prior Publication Data
US 2010/0113731 A1 May 6, 2010

(30) Foreign Application Priority Data
Mar. 30, 2007 (JP) ................................. 2007-093789

(51) Int. Cl.
*C08G 77/04* (2006.01)
(52) U.S. Cl. .............. 528/15; 528/27; 528/29; 556/445; 556/449
(58) Field of Classification Search ............... 528/27, 528/15, 29; 556/445, 449
See application file for complete search history.

(56) References Cited

U.S. PATENT DOCUMENTS

| | | | | |
|---|---|---|---|---|
| 4,460,767 A | * | 7/1984 | Matsumura et al. | 536/124 |
| 4,591,652 A | * | 5/1986 | DePasquale et al. | 556/419 |
| 4,640,940 A | * | 2/1987 | Jacobine et al. | 522/99 |
| 5,831,080 A | * | 11/1998 | Sejpka et al. | 536/124 |
| 5,891,977 A | | 4/1999 | Dietz et al. | |
| 7,001,971 B2 | * | 2/2006 | Nakanishi | 528/29 |
| 2002/0131947 A1 | | 9/2002 | Nakanishi | |
| 2005/0043365 A1 | | 2/2005 | Yoshitake et al. | |
| 2006/0029560 A1 | | 2/2006 | Blin | |

FOREIGN PATENT DOCUMENTS

| | | |
|---|---|---|
| CS | 229088 B6 | 11/1982 |
| JP | 57-209295 A | 12/1982 |
| JP | 62-68820 A | 3/1987 |
| JP | 5-186596 A | 7/1993 |
| JP | 05186596 A * | 7/1993 |
| JP | 5238917 A | 9/1993 |
| JP | 5238926 A | 9/1993 |
| JP | 6-316590 A | 11/1994 |
| JP | 7-41414 A | 2/1995 |
| JP | 7-41417 A | 2/1995 |
| JP | 10-330489 A | 12/1998 |
| JP | 11-92490 A | 4/1999 |
| JP | 2002-119840 A | 4/2002 |
| JP | 2002-179798 A | 6/2002 |
| JP | 2003-146991 A | 5/2003 |
| JP | 2006-28181 A | 2/2006 |

OTHER PUBLICATIONS

International Search Report with Written Opinion dated Jun. 10, 2008.
First Office Action issued Aug. 31, 2011 by the State Intellectual Property Office of P.R. China in counterpart Chinese Patent Application No. 200880009783.2.

\* cited by examiner

*Primary Examiner* — Margaret Moore
(74) *Attorney, Agent, or Firm* — Sughrue Mion, PLLC

(57) ABSTRACT

A sugar-alcohol-modified organopolysiloxane compound represented by formula (1) and processes for producing the compound.

$$R^1-\underset{\underset{R^2}{|}}{\overset{\overset{R^1}{|}}{Si}}O-\left[\underset{\underset{R^1}{|}}{\overset{\overset{R^1}{|}}{Si}}O\right]_a-\left[\underset{\underset{X}{|}}{\overset{\overset{R^1}{|}}{Si}}O\right]_b-\left[\underset{\underset{Y}{|}}{\overset{\overset{R^1}{|}}{Si}}O\right]_c-\underset{\underset{R^2}{|}}{\overset{\overset{R^1}{|}}{Si}}-R^1 \quad (1)$$

(In the formula, $R^1$ represents a hydrocarbon group having 1-8 carbon atoms; X is a group represented by formula (2); Y represents —$R^4O(AO)nR^5$ (wherein AO is an oxyalkylene group having 2-4 carbon atoms, $R^4$ is a divalent hydrocarbon group having 3-5 carbon atoms, $R^5$ is any of a hydrogen atom, a hydrocarbon group having 1-24 carbon atoms, and an acyl group having 2-24 carbon atoms, and n is 1-100); $R^2$ is any of $R^1$, X, and Y; and a is 0-700, b is 0-100, and c is 0-50; provided that when b is 0, at least one of the $R^2$s is X.)

$$-R^3-O-CH_2-\left[\underset{\underset{OH}{|}}{\overset{\overset{}{|}}{CH}}-\underset{\underset{OH}{|}}{\overset{\overset{}{|}}{CH}}\right]_d-\underset{\underset{OH}{|}}{\overset{\overset{}{|}}{CH}}-\underset{\underset{OH}{|}}{\overset{\overset{}{|}}{CH_2}} \quad (2)$$

(In the formula, $R^3$ is a divalent hydrocarbon group having 3-5 carbon atoms; and d is 1-2.)

3 Claims, No Drawings

SUGAR-ALCOHOL-MODIFIED ORGANOPOLYSILOXANE COMPOUND AND PROCESSES FOR PRODUCING THE SAME

TECHNICAL FIELD

The present invention relates to a novel sugar-alcohol-modified organopolysiloxane compound, a sugar-alcohol-modified organopolysiloxane precursor, and processes for producing the compound.

BACKGROUND ART

Organopolysiloxanes are excellent in heat resistance, weatherability, releasability, water repellency, and physiological inertness and are used in various fields. Modified organopolysiloxanes obtained by modifying hydrophobic organopolysiloxanes with a hydrophilic compound to thereby impart surface-active properties thereto are also in general extensive use. Among such modified organopolysiloxanes are polyoxyalkylene-modified organopolysiloxanes obtained by organopolysiloxane modification methods such as, for example, a modification reaction between a polyoxyalkylene having a hydroxyl group at an end and an organopolysiloxane having one or more alkoxy groups, a hydrosilylation modification reaction between a polyoxyalkylene having a double bond, e.g., an allyl group, at an end and a hydrogenorganopolysiloxane, and a modification reaction between a polyoxyalkylene having an epoxy group at an end and an organopolysiloxane containing one or more amino groups. Of these, the hydrosilylation modification reaction is in frequent use. With respect to nonionic modified organopolysiloxanes obtained by the hydrosilylation modification reaction, polyoxyethylene groups are used as a highly hydrophilic modifying group among the polyoxyalkylene groups in more frequent use. However, many modified organopolysiloxane compounds having alcoholic hydroxyl groups, which have even higher hydrophilicity than the oxyethylene group, as a modifying group have been proposed so far. Examples thereof include a modified organopolysiloxane having a glycerol residue, a modified organopolysiloxane having a polyglycerol residue, and a modified organopolysiloxane having a sugar residue. With respect to the modified organopolysiloxane compound having a sugar radical, among those modified organopolysiloxanes, many compounds and processes for producing these have been proposed as shown below.

1) A process for producing a compound which comprises reacting sorbitan with allyl glycidyl ether in the presence of an alkali catalyst to obtain a precursor and subjecting the precursor to hydrosilylation with a hydrogenorganopolysiloxane to obtain the target compound. (e.g., patent document 1)
2) A process for producing a compound which comprises mixing an amino-modified silicone with a sugar lactone and heating the mixture to obtain the target compound through amidation. (e.g., patent document 2)
3) A compound obtained by subjecting a glucoside having an alkenyl group, e.g., allylglucoside, and a hydrogenorganopolysiloxane to hydrosilylation; and a process for producing the compound. (e.g., patent document 3)
4) A compound obtained by subjecting glucose and allyl glycol to dehydrating condensation using a p-toluenesulfonic acid catalyst to obtain a precursor and modifying the precursor with a hydrogenorganopolysiloxane; a process for producing the compound; and a process for production in which an allyl-glycol-modified organopolysiloxane and glucose are subjected to dehydrating condensation. (e.g., patent document 4)
5) A compound obtained by reacting an acetylated sugar with allyl alcohol to obtain a precursor, subjecting the precursor and a hydrogenorganopolysiloxane to hydrosilylation, and decomposing the acetyl groups with sodium methoxide; and a compound obtained by reacting an acetylated sugar with thiourea to obtain a precursor, reacting the precursor with an organopolysiloxane having halogen radicals, and decomposing the acetyl groups with sodium methoxide. (e.g., patent document 5)
6) A process for producing a compound which comprises subjecting a sugar and an intermediate-coupling-chain precursor having a double bond to dehydrating condensation using a p-toluenesulfonic acid catalyst and modifying the condensate with a hydrogenorganopolysiloxane. (e.g., patent document 6)
7) A compound obtained by reacting an acetylated sugar with allyl alcohol to obtain a precursor, subjecting the precursor to an addition reaction with a thiocarboxylic acid or thiol compound to obtain a metal thiolate, and then subjecting the thiolate to a condensation reaction with an organopolysiloxane having halogen radicals. (e.g., patent document 7).

Of those prior-art techniques, 1) and 6) have a possibility that the modification reaction of the precursor having a sugar residue with the reactive organopolysiloxane might result in gelation or resinification because the precursor is a compound which has, per molecule, two or more functional groups reactive with the organopolysiloxane. With respect to 2), since a compound having amino groups is used, there are a problem concerning the odor attributable to the compound and the possibility of discoloration. With respect to 3), 4), 5), and 7), there is a possibility that use of the product compounds might be limited because the glucoside residues as a modifying group have a structure unstable to acids and heat. None of the modified organopolysiloxane compounds which have been found so far, including the modified organopolysiloxane having a glycerol residue described above and the modified organopolysiloxane having a polyglycerol residue described above, is one which can have hydrophilicity effectively imparted thereto with a raw material incorporated even in a smaller amount. Furthermore, no process has also been found in which precursor formation can be controlled so that only one functional group per molecule can be introduced into the precursor and by which a modified organopolysiloxane having sugar residues can be efficiently produced.

Patent Document 1: JP-A-57-209295
Patent Document 2: JP-A-62-68820
Patent Document 3: JP-A-5-186596
Patent Document 4: JP-A-6-316590
Patent Document 5: JP-A-11-92490
Patent Document 6: JP-A-2002-119840
Patent Document 7: JP-A-2003-146991

DISCLOSURE OF THE INVENTION

Problems that the Invention is to Solve

An object of the invention is to provide a novel sugar-alcohol-modified organopolysiloxane compound which can have hydrophilicity effectively imparted thereto with a raw material incorporated even in a smaller amount, by using a precursor having a sugar alcohol residue, and which provides a nonionic surfactant usable in a wide range of applications. Another object is to provide processes for producing the sugar-alcohol-modified organopolysiloxane compound, in which raw-material formation can be controlled so that only one functional group per molecule can be introduced into the raw material and which can efficiently yield the sugar-alcohol-modified organopolysiloxane compound.

Means for Solving the Problems

Namely, the invention provides a sugar-alcohol-modified organopolysiloxane compound represented by formula (1) and formula (2):

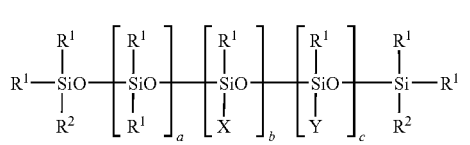

(wherein $R^1$ represents a hydrocarbon group having 1 to 8 carbon atoms; X is a group represented by formula (2); Y represents —$R^4O(AO)nR^5$ (wherein AO is an oxyalkylene group having 2 to 4 carbon atoms, $R^4$ is a divalent hydrocarbon group having 3 to 5 carbon atoms, $R^5$ is any of a hydrogen atom, a hydrocarbon group having 1 to 24 carbon atoms, and an acyl group having 2 to 24 carbon atoms, and n is 1 to 100); $R^2$ is any of $R^1$, X, and Y; and a is 0 to 700, b is 0 to 100, and c is 0 to 50; provided that when b is 0, at least one of the $R^2$s is X)

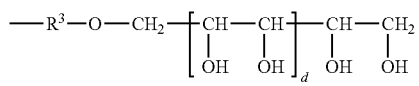

(wherein $R^3$ is a divalent hydrocarbon group having 3 to 5 carbon atoms; and d is 1 to 2).

The invention further provides a sugar-alcohol-modified organopolysiloxane precursor represented by formula (3) and formula (4):

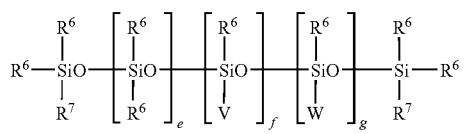

(wherein $R^6$ represents a hydrocarbon group having 1 to 8 carbon atoms; V is a group represented by formula (4); W represents —$R^{11}O(AO)mR^{12}$ (wherein AO is an oxyalkylene group having 2 to 4 carbon atoms, $R^{11}$ is a divalent hydrocarbon group having 3 to 5 carbon atoms, $R^{12}$ is any of a hydrogen atom, a hydrocarbon group having 1 to 24 carbon atoms, and an acyl group having 2 to 24 carbon atoms, and m is 1 to 100); $R^7$ is any of $R^6$, V, and W; and e is 0 to 700, f is 0 to 100, and g is 0 to 50; provided that when f is 0, at least one of the $R^7$s is V)

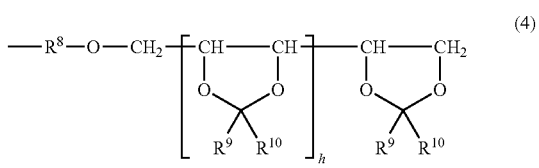

(wherein $R^8$ is a divalent hydrocarbon group having 3 to 5 carbon atoms; $R^9$ and $R^{10}$ each represent a hydrogen atom or an alkyl group having 1 to 4 carbon atoms; and h is 1 to 2; provided that at least one of the $R^9$s and the $R^{10}$s is an alkyl group having 1 to 4 carbon atoms).

The invention furthermore provides a process for producing the sugar-alcohol-modified organopolysiloxane compound, characterized by producing the compound through the following steps:

A. a step in which a pentitol or a heptitol is subjected to a ketal formation reaction using a compound represented by formula (5) in an amount of 1.2 to 1.5 times the theoretical equivalent and further using an acid catalyst in an amount of from $5 \times 10^{-6}$ to $5 \times 10^{-4}$% by mole based on the pentitol or heptitol;

B. a step in which the ketal compound obtained in step A is reacted with an alkenyl halide having 3 to 5 carbon atoms in the presence of an alkali catalyst and the resultant reaction product is purified with an acid or an adsorbent having the ability to adsorb alkalis;

C. a step in which the compound obtained in step B is subjected to a hydrosilylation reaction using chloroplatinic acid as a catalyst to obtain a sugar-alcohol-modified organopolysiloxane precursor; and D. a step in which the compound obtained in step C is hydrolyzed with an acid to obtain a sugar-alcohol-modified organopolysiloxane compound:

(wherein $R^{13}$ and $R^{14}$ each represent a hydrogen atom or an alkyl group having 1 to 4 carbon atoms, and $R^{15}$ and $R^{16}$ each represent an alkyl group having 1 to 4 carbon atoms, provided that at least one of the $R^{13}$ and the $R^{14}$ is an alkyl group having 1 to 4 carbon atoms).

The invention still further provides a process for producing the sugar-alcohol-modified organopolysiloxane compound, characterized by producing the compound through the following steps:

E. a step in which a pentitol or a heptitol is subjected to a ketal formation reaction using a compound represented by formula (5) in an amount of 1.2 to 1.5 times the theoretical equivalent and further using an acid catalyst in an amount of from $5 \times 10^{-6}$ to $5 \times 10^{-4}$% by mole based on the pentitol or heptitol;

F. a step in which the ketal compound obtained in step E is reacted with an alkenyl halide having 3 to 5 carbon atoms in the presence of an alkali catalyst and the resultant reaction product is purified with an acid or an adsorbent having the ability to adsorb alkalis;

G. a step in which the compound obtained in step F is hydrolyzed with an acid to obtain a pentitol monoalkenyl ether or heptitol monoalkenyl ether represented by formula (6)

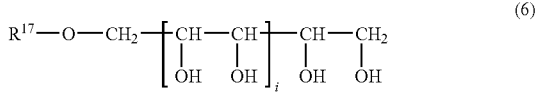

(6)

(wherein $R^{17}$ represents an alkenyl group having 3 to 5 carbon atoms, and i is 1 to 2); and H. a step in which the compound obtained in step G is subjected to a hydrosilylation reaction using chloroplatinic acid as a catalyst to obtain a sugar-alcohol-modified organopolysiloxane compound.

Advantages of the Invention

The sugar-alcohol-modified organopolysiloxane compound of the invention is a novel modified organopolysiloxane compound which has a specific sugar alcohol residue and can have hydrophilicity effectively imparted thereto with a raw material incorporated even in a smaller amount. By changing the molecular weight of a hydrogenorganopolysiloxane and the number of Si—H groups contained therein, the hydrophilicity can be regulated at will. By combining these, a nonionic surfactant can be obtained which has excellent surface-active properties, such as impartation of emulsifiability, impartation of emulsion stability or thixotropic properties to the emulsion, and impartation of dispersibility. The sugar-alcohol-modified organopolysiloxane precursor of the invention is exceedingly useful as a precursor for obtaining the sugar-alcohol-modified organopolysiloxane compound therefrom. Furthermore, the processes of the invention for producing the sugar-alcohol-modified organopolysiloxane compound are capable of control so that the precursor can have only one functional group introduced therein, and the sugar-alcohol-modified organopolysiloxane compound having a high purity can be efficiently produced.

BEST MODE FOR CARRYING OUT THE INVENTION

The sugar-alcohol-modified organopolysiloxane compound of the invention has a structure represented by formula (1). In formula (1), $R^1$ represents a hydrocarbon group having 1 to 8 carbon atoms; X is a group represented by formula (2); Y represents —$R^4$O(AO)n$R^5$ (wherein AO is an oxyalkylene group having 2 to 4 carbon atoms, $R^4$ is a divalent hydrocarbon group having 3 to 5 carbon atoms, $R^5$ is any of a hydrogen atom, a hydrocarbon group having 1 to 24 carbon atoms, and an acyl group having 2 to 24 carbon atoms, and n is 1 to 100); $R^2$ is any of $R^1$, X, and Y; and a is 0 to 700, b is 0 to 100, and c is 0 to 50; provided that when b is 0, at least one of the $R^2$s is X. In formula (2), $R^3$ is a divalent hydrocarbon group having 3 to 5 carbon atoms; and d is 1 to 2.

The sugar-alcohol-modified organopolysiloxane precursor of the invention has a structure represented by formula (3). In formula (3), $R^6$ represents a hydrocarbon group having 1 to 8 carbon atoms; V is a group represented by formula (4); W represents —$R^{11}$O(AO)m$R^{12}$ (wherein AO is an oxyalkylene group having 2 to 4 carbon atoms, $R^{11}$ is a divalent hydrocarbon group having 3 to 5 carbon atoms, $R^{12}$ is any of a hydrogen atom, a hydrocarbon group having 1 to 24 carbon atoms, and an acyl group having 2 to 24 carbon atoms, and m is 1 to 100); $R^7$ is any of $R^6$, V, and W; and e is 0 to 700, f is 0 to 100, and g is 0 to 50; provided that when f is 0, at least one of the $R^7$s is V. In formula (4), $R^8$ is a divalent hydrocarbon group having 3 to 5 carbon atoms; $R^9$ and $R^{10}$ each represent a hydrogen atom or an alkyl group having 1 to 4 carbon atoms; and h is 1 to 2; provided that at least one of the $R^9$s and the $R^{10}$s is an alkyl group having 1 to 4 carbon atoms.

In formula (1), $R^1$ is a hydrocarbon group having 1 to 8 carbon atoms; X is a group represented by formula (2); and Y is —$R^4$O(AO)n$R^5$.

In formula (3), $R^6$ is a hydrocarbon group having 1 to 8 carbon atoms; V is a group represented by formula (4); and W is —$R^{11}$O(AO)m$R^{12}$.

In formula (1) and formula (3), $R^1$ and $R^6$ each are a hydrocarbon group having 1 to 8 carbon atoms. Examples thereof include methyl, ethyl, propyl, isopropyl, butyl, isobutyl, t-butyl, pentyl, isopentyl, hexyl, isoheptyl, 2-ethylhexyl, and octyl. Preferred is methyl.

In formula (1), formula (2), formula (3), and formula (4), $R^3$, $R^4$, $R^8$, and $R^{11}$ each are a divalent hydrocarbon group having 3 to 5 carbon atoms. Examples thereof include propylene, isopropylene, butylene, isobutylene, pentene, and isopentene. Preferred are propylene and isobutylene.

In formula (1) and formula (3), $R^5$ and $R^{12}$ each are any of a hydrogen atom, a hydrocarbon group having 1 to 24 carbon atoms, and an acyl group having 2 to 24 carbon atoms. Examples of the hydrocarbon group having 1 to 24 carbon atoms include methyl, ethyl, propyl, isopropyl, butyl, isobutyl, t-butyl, pentyl, isopentyl, hexyl, isoheptyl, 2-ethylhexyl, octyl, isononyl, decyl, dodecyl, isotridecyl, tetradecyl, hexadecyl, isocetyl, octadecyl, isostearyl, oleyl, eicosyl, docosyl, and tetracosyl. Examples of the acyl group having 2 to 24 carbon atoms include the acyl groups derived from acetic acid, propionic acid, butyric acid, isobutyric acid, caprylic acid, 2-ethylhexylic acid, isononanoic acid, capric acid, lauric acid, myristic acid, palmitic acid, isopalmitic acid, stearic acid, isostearic acid, oleic acid, arachic acid, behenic acid, lignoceric acid, benzoic acid, and toluic acid. Preferred are a hydrogen atom, methyl, butyl, and the acyl group derived from acetic acid.

In formula (4), $R^9$ and $R^{10}$ each are either of a hydrogen atom and an alkyl group having 1 to 4 carbon atoms. Examples thereof include methyl, ethyl, propyl, and butyl. Preferred are methyl and ethyl. More preferred is methyl.

In formula (1), $R^2$ is any of $R^1$, X, and Y, and preferably is $R^1$ or X.

In formula (3), $R^7$ is any of $R^6$, V, and W, and preferably is $R^6$ or V.

In formula (1) and formula (3), AO is an oxyalkylene group having 2 to 4 carbon atoms. Examples thereof include oxyethylene, oxypropylene, oxybutylene, oxytrimethylene, and oxytetramethylene. Preferred are oxyethylene and oxypropylene.

In formula (1) and formula (3), n and m each are 1 to 100, preferably 1 to 80, more preferably 3 to 70.

In formula (1), a is 0 to 700, b is 0 to 100, and c is 0 to 50. Preferably, a is 0 to 200, b is 0 to 50, and c is 0 to 10. When b=0, at least one of the $R^2$s is X.

In formula (3), e is 0 to 700, f is 0 to 100, and g is 0 to 50. Preferably, e is 0 to 200, f is 0 to 50, and g is 0 to 10. When f=0, at least one of the $R^7$s is V.

In formula (2) and formula (4), d and h each are 1 to 2, preferably 1.

With respect to the processes of the invention for producing the sugar-alcohol-modified organopolysiloxane compound, the target compound can be produced specifically by the method shown below.

1. Ketal Formation Reaction:

As a sugar alcohol to be subjected to a ketal formation reaction, use is made of a pentitol or a heptitol, which each have 5 or 7 carbon atoms. Examples of the pentitol include D-arabitol, L-arabitol, xylitol, and ribitol. Examples of the heptitol include α-D-glucoheptitol, β-D-glucoheptitol, β-L-glucoheptitol, α-D-mannoheptitol, α-L-mannoheptitol, β-D-mannoheptitol, β-D-altroheptitol, β-L-altroheptitol, β-D-galaheptitol, β-L-galaheptitol, β-idoheptitol, β-alloheptitol, and α-D-alloheptitol. Preferred are D-arabitol, L-arabitol, xylitol, and ribitol. More preferred is xylitol. These sugar alcohols may be either natural ones or synthetic ones, and may be used either alone or as a mixture of two or more thereof.

Next, a compound represented by formula (5) is used as a ketal-forming agent in the invention. In formula (5), $R^{13}$ and $R^{14}$ each represent a hydrogen atom or an alkyl group having 1 to 4 carbon atoms, and $R^{15}$ and $R^{16}$ each represent an alkyl group having 1 to 4 carbon atoms, provided that at least one of the $R^{13}$ and the $R^{14}$ is an alkyl group having 1 to 4 carbon atoms. Examples of the alkyl groups having 1 to 4 carbon atoms which are represented by $R^{13}$, $R^{14}$, $R^{15}$, and $R^{16}$ include methyl, ethyl, propyl, and butyl. The groups represented by $R^{13}$ to $R^{16}$ may be of one kind or may be a mixture of two or more of those. $R^{13}$ to $R^{16}$ preferably are methyl or ethyl, and more preferably are methyl.

When a pentitol or heptitol and a compound represented by formula (5) are used to conduct a ketal formation reaction, the charge amount of the compound represented by formula (5) to be used is 1.2 to 1.5 times the theoretical equivalent. The amount thereof is more preferably 1.3 to 1.5 times, even more preferably 1.3 to 1.4 times, the theoretical equivalent. The term "theoretical equivalent" means the necessary amount calculated from the chemical equation. For example, in the case of the compound represented by formula (5), the theoretical amount thereof is 2 equivalents to the pentitol and is 3 equivalents to the heptitol. More specifically, in the case of a pentitol, the amount of the compound represented by formula (5) to be charged is 2.4 to 3.0 mol, more preferably 2.6 to 3.0 mol, even more preferably 2.6 to 2.8 mol, per mol of the pentitol. In the case of a heptitol, the amount of the compound represented by formula (5) is 3.6 to 4.5 mol, more preferably 3.9 to 4.5 mol, even more preferably 3.9 to 4.2 mol, per mol of the heptitol.

In case where the charge amount of the compound represented by formula (5) is smaller than 1.2 times the theoretical equivalent, complete replacement with ketal groups is not attained. As a result, mono-ketal forms and the unreacted pentitol remain in a larger proportion in the case of a pentitol, or mono-ketal forms, di-ketal forms, and the unreacted heptitol remain in a larger proportion in the case of a heptitol. Consequently, a large amount of hydroxyl groups remain unconverted to ketal groups, and the subsequent alkenyl introduction step results in a higher content of compounds each containing two or more alkenyl groups per molecule. There is hence a possibility that the resultant product, when used as a raw material for a copolymer or as a modifying material, might have undesirable performance, e.g., the product crosslinks and solidifies.

On the other hand, in case where the charge amount thereof exceeds 1.5 times the theoretical equivalent, the recovery of the excess raw material requires much time and this is not efficient. In addition, there is a possibility that dimers might generate as by-products and the reaction product might increase in viscosity or solidify. By this ketal formation reaction, a pentitol diketal derivative or heptitol triketal derivative which has one hydroxyl group and is represented by formula (7) is obtained.

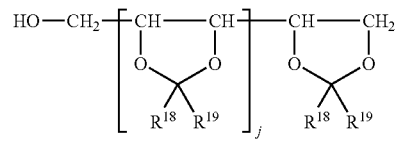

(In the formula, $R^{18}$ and $R^{19}$ each represent a hydrogen atom or an alkyl group having 1 to 4 carbon atoms, and j is 1 to 2, provided that at least one of the $R^{18}$s and the $R^{19}$s is an alkyl group having 1 to 4 carbon atoms.)

The pentitol diketal derivative or heptitol triketal derivative which has one hydroxyl group is obtained as a mixture of structural isomers differing in the position of the hydroxyl group or as a mixture of stereoisomers. These derivatives may be used as they are, or may be used after being further purified by distillation or the like. For example, in the case where xylitol is used to conduct the ketal formation, 1,2,3,4-di-O-isopropylidene-DL-xylitol and 1,2,4,5-di-O-isopropylidene-DL-xylitol are obtained as an about 90:10 mixture thereof.

Examples of the acid catalyst to be used in the ketal formation reaction include acid catalysts such as acetic acid, hydrochloric acid, zinc chloride, ammonium chloride, phosphoric acid, nitric acid, sulfuric acid, copper sulfate, p-toluenesulfonic acid, boron trifluoride etherates, and diphosphorus pentoxide. Especially preferred is p-toluenesulfonic acid. The p-toluenesulfonic acid may be an anhydride or monohydrate. The amount of the acid catalyst to be used is $5 \times 10^{-6}$ to $5 \times 10^{-4}$% by mole, more preferably $7 \times 10^{-6}$ to $4 \times 10^{-4}$% by mole, even more preferably $1 \times 10^{-5}$ to $3 \times 10^{-4}$% by mole, based on the pentitol or heptitol. In case where the amount of the acid catalyst used is smaller than $5 \times 10^{-6}$% by mole, the ketal formation reaction does not proceed completely. In case where the amount thereof exceeds $5 \times 10^{-4}$% by mole, ketal group decomposition occurs during the recovery of by-products of the reaction and the excess compound represented by formula (5). In addition, the reaction product is discolored and comes to have an enhanced hue. Incidentally, the compounds represented by formula (5) usable for the reaction each preferably are neutral.

In the process of the invention, conditions for the ketal formation reaction are not particularly limited and may be suitably selected according to circumstances. The reaction temperature is set generally in the range of 30 to 90° C., and is especially preferably 60 to 80° C. In case where the reaction temperature is lower than 30° C., there is a possibility that stirring efficiency might decrease because the pentitol diketal or heptitol triketal has a high viscosity. When the reaction temperature exceeds 90° C., there are cases where such a high temperature is causative of discoloration. After the ketal formation reaction, by-products and the excess compound represented by formula (5) are recovered generally at ordinary pressure in an inert gas stream. However, for completely distilling off these compounds, use is made of a method in which, at the time when the distillation of the by-products and the excess compound represented by formula (5) has terminated, the system is brought into a vacuum state and the remaining compounds to be removed are then distilled off. When the system in the stage where distillation still continues is brought into a vacuum state, there are cases where ketal group decomposition occurs and the target product has a reduced degree of substitution with ketal groups.

In the invention, the acid catalyst is used in an extremely slight amount. Because of this, when the pentitol diketal derivative or heptitol triketal derivative obtained, which has one hydroxyl group, is to be used as a raw material in another reaction, there may be no need of conducting a neutralization treatment or removing the catalyst. In some applications, however, there are cases where catalyst deactivation or removal is necessary. In this case, it is preferred to conduct a treatment with an alkaline neutralizer in general use, such as sodium hydroxide, potassium hydroxide, sodium carbonate, or sodium acetate, or with an adsorbent having the ability to adsorb acids. Examples of commercial products of the adsorbent having acid-adsorbing ability include Kyowaad 100 (MgO), Kyowaad 300 ($2.5MgO.Al_2O_3.xH_2O$), Kyowaad 500 ($Mg_6Al_2(OH)_{16}CO_3.4H_2O$), Kyowaad 600 ($2MgO.6SiO_2.xH_2O$), and Kyowaad 1000 ($Mg_{4.5}Al_2(OH)_{13}CO_3.3.5H_2O$) (manufactured by Kyowa Chemical Industry Co., Ltd.); and Tomix AD-100 (MgO, 97.8%), Tomix AD-500 (MgO, 37.4%; $Al_2O_3$, 17.2%; $CO_2$, 8.1%), and Tomix AD-800 ($SiO_2$, 42.1%; CaO, 31.5%) (manufactured by Tomita Seiyaku K.K.).

2. Alkenyl Ether Formation Reaction:

The compound represented by formula (7) obtained by the ketal formation reaction described under 1. above is reacted with an alkenyl halide in the presence of an alkali catalyst to produce a pentitol diketal derivative or heptitol triketal derivative having one alkenyl group.

The alkenyl introduction reaction of the pentitol diketal or heptitol triketal having one hydroxyl group in the process of the invention can be conducted using a known technique. Specifically, an alkenyl halide is caused to act, in the presence of an alkali catalyst, on the pentitol diketal or heptitol triketal having one hydroxyl group. Examples of the alkali catalyst to be used in the alkenyl introduction reaction include sodium metal, potassium metal, sodium hydride, potassium hydride, sodium hydroxide, potassium hydroxide, sodium methoxide, and potassium methoxide. These may be used alone or as a mixture of two or more thereof. Preferred are sodium hydroxide and potassium hydroxide.

The terminal-alkenyl-containing halogen compound to be used in the alkenyl introduction reaction is a linear or branched halide having 3-5 carbon atoms and having a terminal alkenyl group. Examples thereof include allyl chloride, allyl bromide, allyl iodide, methallyl chloride, methallyl bromide, methallyl iodide, 3-butenyl chloride, 3-butenyl bromide, 3-butenyl iodide, 3-methyl-3-butenyl chloride, 3-methyl-3-butenyl bromide, and 3-methyl-3-butenyl iodide. Preferred are allyl chloride and methallyl chloride.

The reaction temperature in the alkenyl introduction reaction is preferably 60 to 140° C., more preferably 80 to 130° C. In case where the reaction temperature is lower than 60° C., reaction rate decreases and this is causative of an increase in reaction time and an increase in the amount of residual pentitol diketal or heptitol triketal. In case where the reaction temperature is higher than 140° C., such a high temperature is causative of the internal rearrangement of the double bond.

Purification after completion of the alkenyl introduction reaction may be conducted by a known technique. Namely, use is made of a method which includes distilling off the excess alkenyl halide, subsequently adding water to the residue to cause salting-out and thereby form separate layers, and separating and removing the excess alkali catalyst and the inorganic salt. The amount of the water to be used in the salting-out step is preferably 200 to 500 parts by weight per 100 parts by weight of the alkali catalyst used in the alkenyl introduction reaction. With respect to conditions, it is preferred to allow the mixture to stand at a temperature of 60 to 100° C. for a period of from 20 minutes to 4 hours. After the mixture has separated into an aqueous layer and an organic layer, an operation for discharging the aqueous layer is conducted.

In the organic layer obtained after the aqueous-layer discharge operation, an alkali ingredient remains in a slight amount. The organic layer is hence neutralized. Although neutralization with an acid is usually conducted, the pentitol diketal derivative or heptitol triketal derivative having one alkenyl group according to the invention disadvantageously undergoes ketal group hydrolysis in a strongly acidic region in the presence of water, etc.

Because of this, an acid or an adsorbent having the ability to adsorb alkalis is used to conduct neutralization in the invention. By regulating the pH during the neutralization, the alkali ingredient can be removed without decomposing the ketal groups.

Examples of the acid to be used in the invention include formic acid, acetic acid, propionic acid, butyric acid, isobutyric acid, valeric acid, caproic acid, enanthic acid, caprylic acid, pelargonic acid, capric acid, pivalic acid, oxalic acid, hydrochloric acid, phosphoric acid, nitric acid, sulfuric acid, p-toluenesulfonic anhydride, p-toluenesulfonic acid monohydrate, benzenesulfonic acid, cyclohexanecarboxylic acid, benzoic acid, salicylic acid, and acetylsalicylic acid. Preferred are hydrochloric acid, phosphoric acid, and acetic acid. As the adsorbent having the ability to adsorb alkalis, various adsorbents having alkali-adsorbing ability are usable. Examples thereof include activated clay, synthetic zeolites, activated carbon, activated alumina, silica gel, and magnesia. Examples of commercial products of adsorbents suitable for use in the process of the invention include Kyowaad 600 ($2Mg.6SiO_2.xH_2O$) and Kyowaad 700 ($Al_2O_3.9SiO_2.H_2O$) (manufactured by Kyowa Chemical Industry Co., Ltd.); and Tomix AD-300 (MgO, 13.2%; $Al_2O_3$, 31.0%; $SiO_2$, 30.5%), Tomix AD-600 (MgO, 14.2%; $SiO_2$, 63.2%), and Tomix AD-700 ($Al_2O_3$, 11.2%; $SiO_2$, 68.0%) (manufactured by Tomita Seiyaku K.K.). Those acids or those adsorbents having alkali-adsorbing ability may be used alone or as a mixture of two or more thereof. The acids may be used as they are, or may be used as a dilution with water, etc.

In the invention, it is preferred to regulate the pH resulting from the neutralization so as to be in the range of preferably 5.0 to 7.5, more preferably 5.3 to 7.2, even more preferably 5.5 to 7.0. Values of pH after neutralization lower than 5.0 are undesirable because ketal group decomposition occurs. Values of pH exceeding 7.5 are undesirable because the alkali metal compound remains and this may cause side reactions when the resultant product is used as a raw material for a copolymer or as a modifying material or may cause the internal rearrangement of the terminal double bond. The temperature at which the treatment with an acid or an adsorbent having alkali-adsorbing ability is to be conducted cannot be fixed unconditionally. However, the temperature is generally 50 to 100° C., preferably 60 to 90° C. The amount of the acid or adsorbent to be added varies depending on the amount and kind of the alkali catalyst which remains. However, the amount thereof may be, for example, in the range of 0.5 to 5% by mass based on the amount of the raw materials charged. In case where the amount of the acid or adsorbent is too small, the alkali ingredient cannot be completely neutralized. On the other hand, in case where the amount thereof is too large, there is a possibility that ketal groups might be decomposed. After the neutralization with an acid or an adsorbent having alkali-adsorbing ability, the salt which has precipitated and the adsorbent used for the treatment may be removed by filtration, centrifugal separation, or the like.

The pentitol diketal derivative or heptitol triketal derivative obtained by the method described above, which has one alkenyl group, can be further improved in purity by distillation, etc.

By this alkenyl ether formation reaction, a pentitol diketal derivative or heptitol triketal derivative having one alkenyl group and represented by formula (8) is obtained.

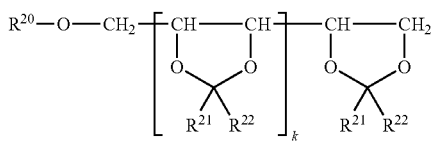
(8)

(In formula (8), $R^{20}$ represents an alkenyl group having 3 to 5 carbon atoms; $R^{21}$ and $R^{22}$ each represent a hydrogen atom or an alkyl group having 1 to 4 carbon atoms; and k is 1 to 2; provided that at least one of the $R^{21}$s and the $R^{22}$s is an alkyl group having 1 to 4 carbon atoms.)

3. Hydrosilylation Reaction:

The compound represented by formula (8) obtained by the alkenyl ether formation described under 2. above and a hydrogenorganopolysiloxane represented by formula (9) are subjected to a hydrosilylation reaction in the presence of a catalyst. As a result, a sugar-alcohol-modified organopolysiloxane precursor represented by formula (3) and formula (4) is obtained.

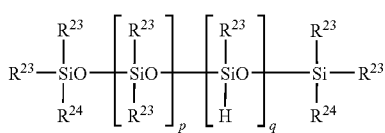
(9)

The raw-material hydrogenorganopolysiloxane to be used in the hydrosilylation reaction is represented by formula (9), wherein $R^{23}$ is a hydrocarbon group having 1 to 8 carbon atoms; $R^{24}$ is a hydrogen atom or a hydrocarbon group having 1 to 8 carbon atoms; and p is 0 to 700 and q is 0 to 100; provided that when q is 0, at least one of the $R^{24}$s is a hydrogen atom. Preferably, $R^{23}$ is methyl, p is 0 to 200, and q is 0 to 50.

Examples of the catalyst to be used in the reaction between the compound represented by formula (8) and the hydrogenorganopolysiloxane of formula (9) include transition metals in Group VIII, such as nickel, ruthenium, rhodium, palladium, iridium, and platinum, and compounds of these metals. However, chloroplatinic acid is preferred because this compound is easily available and alcohol solutions thereof constitute a homogeneous catalyst system and are hence easy to handle. A solvent may be used in this reaction according to need. Examples of the solvent to be used include carbon tetrachloride, toluene, xylene, hexane, octane, dibutyl ether, dioxane, tetrahydrofuran, ethyl acetate, butyl acetate, methyl ethyl ketone ethanol, isopropanol, and n-butanol. With respect to methods for introducing the reactants, there are, for example, the following methods: a method in which the compound of formula (8) and the hydrogenorganopolysiloxane of formula (9) are introduced en bloc; a method in which part of the compound of formula (8) is introduced together with the hydrogenorganopolysiloxane of formula (9) and the remainder of the compound of formula (8) is subsequently introduced continuously; and a method in which the hydrogenorganopolysiloxane of formula (9) is introduced and the compound of formula (8) is subsequently introduced continuously. For the purpose of completely reacting the reactive group Si—H contained in formula (9), a hydrocarbon having 4 to 8 carbon atoms and having a double bond at an end, such as, e.g., 1-butene, isobutene, 1-pentene, 1-hexene, 1-heptene, or 1-octene, may be additionally incorporated and reacted. Furthermore, a polyoxyalkylene compound having an alkenyl group at an end and represented by formula (10) may be used to conduct co-modification in order to facilitate handling during synthesis.

(10)

In formula (10), AO is an oxyalkylene group having 2 to 4 carbon atoms. Examples thereof include oxyethylene, oxypropylene, oxybutylene, oxytrimethylene, and oxytetramethylene. Preferred are oxyethylene and oxypropylene. Symbol r indicates the average number of moles of the oxyalkylene group added, and is 1 to 100, preferably 1 to 80, more preferably 3 to 70. $R^{25}$ is an alkenyl group having 3 to 5 carbon atoms and having a double bond at an end. Examples thereof include allyl, methallyl, 3-butenyl, and 3-methyl-3-butenyl. Preferred are allyl and methallyl. $R^{26}$ is any of a hydrogen atom, a hydrocarbon group having 1 to 24 carbon atoms, and an acyl group having 2 to 24 carbon atoms. Examples of the hydrocarbon group having 1 to 24 carbon atoms include methyl, ethyl, propyl, isopropyl, butyl, isobutyl, t-butyl, pentyl, isopentyl, hexyl, isoheptyl, 2-ethylhexyl, octyl, isononyl, decyl, dodecyl, isotridecyl, tetradecyl, hexadecyl, isocetyl, octadecyl, oleyl, isostearyl, oleyl, eicosyl, docosyl, and tetracosyl. Examples of the acyl group having 2 to 24 carbon atoms include the acyl groups derived from acetic acid, propionic acid, butyric acid, isobutyric acid, caprylic acid, 2-ethylhexylic acid, isononanoic acid, capric acid, lauric acid, myristic acid, palmitic acid, isopalmitic acid, stearic acid, oleic acid, isostearic acid, arachic acid, behenic acid, and lignoceric acid. Preferred are a hydrogen atom, methyl, butyl, and the acyl group derived from acetic acid. In the case where such a polyoxyalkylene compound having an alkenyl group at an end is used to conduct co-modification, the proportion of the compound represented by formula (8) to the polyoxyalkylene compound having an alkenyl group at an end can be in the range shown by formula (3).

4. Ketal Removal Reaction

The compound represented by formula (3) and formula (4) obtained by the hydrosilylation reaction described under 3. above is hydrolyzed with an acid, whereby a sugar-alcohol-modified organopolysiloxane compound represented by formula (1) and formula (2) can be obtained.

For the acid hydrolysis, use may be made, for example, of a method which includes adding 0.2 to 5 parts by weight of an acid and 5 to 40% water to 100 parts by weight of the compound represented by formula (3) and formula (4) to conduct acid hydrolysis, distilling off the resultant carbonyl compound and the water while bubbling an inert gas into the reaction mixture, subsequently neutralizing the reaction mixture with an alkali to regulate the pH to a neutral value, dehydrating this mixture, and then filtering off the salt generated. Examples of the acid to be used include mineral acids such as hydrochloric acid, phosphoric acid, and sulfuric acid and organic acids such as acetic acid and p-toluenesulfonic acid. From the standpoint of post-treatment, etc., hydrochloric acid and phosphoric acid are suitable of those acids. According to need, an alcohol such as ethanol or isopropyl alcohol can be simultaneously added in order to improve contact with water. After the hydrosilylation reaction, the ketal removal may be conducted after the catalyst and the solvent have been removed or may be conducted without conducting purification.

Besides the process described above, use may be made of a process which includes: using a pentitol or a heptitol to conduct a ketal formation reaction; subsequently using an alkenyl halide having 3 to 5 carbon atoms to conduct an alkenyl ether formation reaction; thereafter conducting a ketal removal reaction, followed by acid hydrolysis to obtain a pentitol monoalkenyl ether or heptitol monoalkenyl ether represented by formula (6); and subjecting the ether represented by formula (6) to a hydrosilylation reaction using chloroplatinic acid as a catalyst to obtain a sugar-alcohol-modified organopolysiloxane compound. With respect to reaction conditions, these steps can be conducted according to the methods described under 1. to 4. above.

Consequently, the sugar-alcohol-modified organopolysiloxane compound of the invention is a novel modified organopolysiloxane compound which has a specific sugar alcohol residue and can have hydrophilicity effectively imparted thereto with a raw material incorporated even in a smaller amount. By changing the molecular weight of the hydrogenorganopolysiloxane and the number of Si—H groups contained therein, the hydrophilicity can be regulated at will. This sugar-alcohol-modified organopolysiloxane compound can be a nonionic surfactant having surface-active properties including excellent emulsifying properties and excellent dispersing ability. This compound can hence be used in a wide range of applications including cosmetic materials having no tackiness and having humectant properties, textile oils, additives for coating materials, and foam stabilizers. On the other hand, the sugar-alcohol-modified organopolysiloxane precursor of the invention is exceedingly useful as a precursor for obtaining the sugar-alcohol-modified organopolysiloxane compound therefrom. Furthermore, the processes of the invention for producing the sugar-alcohol-modified organopolysiloxane compound are useful because the processes are capable of control so that the precursor can have only one functional group introduced therein, and because the sugar-alcohol-modified organopolysiloxane compound having a high purity can hence be efficiently produced.

EXAMPLES

The invention will be explained below in more detail by reference to Examples. Products synthesized were analyzed by the following methods.
(Methods of Experiment)
Hydroxyl value: JIS K 1557-1
Dynamic viscosity: JIS K 2283
Degree of unsaturation: JIS K 1557-3
(Method of Determining Purity by Gas Chromatography (Hereinafter Abbreviated to GC Purity))
Sample: 0.1 wt % toluene solution
Sample injection amount: 1 μL
Column: J&W 123-7033 DB-WAX (30 m×320 μm×0.5 μm)
Carrier gas: He, 3 mL/min
Column temperature: 160° C.; after 30 minutes, elevated to 240° C. at 5° C./min.
Detector: FID Example 1

Into a four-necked flask having a capacity of 3 L and equipped with a stirrer, nitrogen introduction tube, thermocouple, condenser, and oil/water separatory tube were introduced 700.0 g of xylitol (reagent: manufactured by Wako Pure Chemical Industries, Ltd.), 1,291.2 g of 2,2-dimethoxypropane, and 26.5 mg of p-toluenesulfonic acid monohydrate. The atmosphere in the reaction system was replaced with nitrogen. Thereafter, the contents were held at 60 to 90° C. and reacted for 2 hours. After completion of the reaction, the methanol yielded as a by-product and the excess 2,2-dimethoxypropane were distilled off with heating at ordinary pressure in a nitrogen stream, and the distillate was passed through the condenser and the oil/water separatory tube and recovered after condensation. It was ascertained that the discharge of the distillate had stopped. Thereafter, by-products contained in a slight amount and the excess raw materials were removed at 80 to 100° C. and 10 mmHg (gauge pressure) for 1 hour to obtain 1,013.6 g of the diisopropylidenexylitol represented by formula (11). This compound was liquid at 10° C. and had a dynamic viscosity (25° C.) of 498.6 mm$^2$/s and a GC purity of 95%.

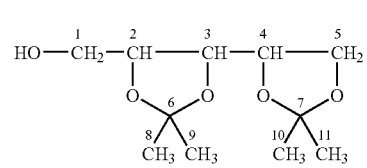

(11)

Assignment by $^{13}$C-NMR Spectroscopy (numerals in the parentheses indicate chemical shifts; unit, ppm)
$C_1$ (62.1), $C_2$ (76.7), $C_3$ (77.6), $C_4$ (75.0), $C_5$ (65.5), $C_6$-$C_7$ (109.6, 109.7), $C_8$-$C_{11}$ (27.1, 27.0, 26.1, 25.4)

Subsequently, 700.0 g of the diisopropylidenexylitol represented by formula (11) obtained by the method described above, 349.0 g of potassium hydroxide, and 277.3 g of allyl chloride were introduced into an autoclave having a capacity of 5 L and equipped with a stirrer, nitrogen introduction tube, and thermocouple. The atmosphere in the system was replaced with nitrogen. Thereafter, the contents were heated to 110° C. with stirring and reacted for 3 hours. Water (1,045 g) was added thereto, and the resultant mixture was stirred for 10 minutes and then allowed to stand for 1 hour and separate into layers. The lower layer, which was water containing the alkali, was discharged. The remaining organic layer was neutralized with 10.2 g of 10% by weight phosphoric acid, dehydrated by nitrogen bubbling for 1 hour at 100° C. and a pressure of −0.097 MPa (gauge pressure) or lower, and filtered. As a result, 691.8 g of the diisopropylidenexylitol monoallyl ether represented by formula (12) was obtained. This compound had a hydroxyl value of 13 KOH-mg/g, dynamic viscosity (25° C.) of 19 mm$^2$/s, degree of unsaturation of 3.3 meq/g, and GC purity of 94%.

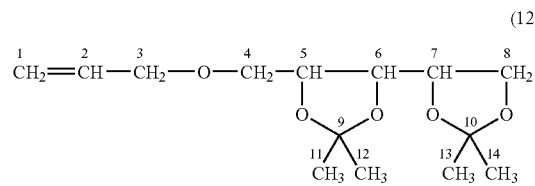

(12)

Assignment by $^{13}$C-NMR Spectroscopy (numerals in the parentheses indicate chemical shifts; unit, ppm)
$C_1$ (117.3), $C_2$ (134.3), $C_3$ (72.5), $C_4$ (70.6), $C_5$ (76.4), $C_6$ (78.5), $C_7$ (75.7), $C_8$ (65.7), $C_9$-$C_{10}$ (109.7, 109.8), $C_{11}$-$C_{14}$ (27.0, 27.0, 26.2, 25.5)

Subsequently, 200.0 g of the hydrogendimethylpolysiloxane represented by formula (13) (HMS-301, manufactured by AZmax Co.) was introduced into a four-necked flask having a capacity of 1 L and equipped with a stirrer, nitrogen introduction tube, thermocouple, and condenser. An isopropyl alcohol solution of chloroplatinic acid hexahydrate ($1 \times 10^{-3}$ mol/L) was also introduced thereinto as a catalyst in such an amount as to result in a concentration of 40 ppm in terms of platinum amount. While the contents were being stirred in a nitrogen atmosphere, 260 g of the diisopropylidenexylitol monoallyl ether represented by formula (12) obtained above was added dropwise thereto and reacted at 90° C. In the course of the reaction, 27.5 g of 1-octene was added. The reaction mixture was sampled, and an N/10 isopropyl alcohol solution of potassium hydroxide was added to the sample; the reaction was continued until the addition of the isopropyl alcohol solution came not to result in hydrogen gas evolution. The excess 1-octene added was distilled off to obtain 418.3 g of the sugar-alcohol-modified organopolysiloxane precursor represented by formula (14).

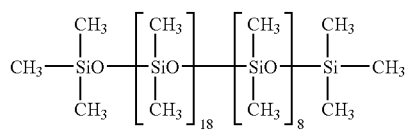

(13)

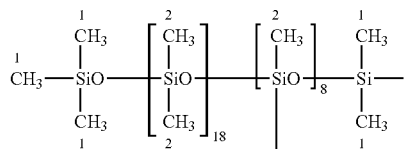

(14)

Assignment by $^{13}$C-NMR Spectroscopy (numerals in the parentheses indicate chemical shifts; unit, ppm)

$C_1$ (1.8), $C_2$ (1.0), $C_3$ (13.4), $C_4$ (23.0), $C_5$ (71.9), $C_6$ (71.4), $C_7$ (75.8), $C_8$ (78.7), $C_9$ (74.5), $C_{10}$ (65.7), $C_{11}$-$C_{12}$ (109.6, 109.7), $C_{13}$-$C_{16}$ (27.0, 27.0, 26.3, 25.5)

Subsequently, 350.0 g of the sugar-alcohol-modified organopolysiloxane precursor of formula (14) was introduced into a four-necked flask having a capacity of 1 L and equipped with a stirrer, nitrogen introduction tube, thermocouple, and condenser. Thereto were added 35 g of water, 42 g of 10% by weight phosphoric acid, and 140 g of isopropyl alcohol. The contents were stirred for 2 hours in a closed state while refluxing the isopropyl alcohol. Thereafter, the isopropyl alcohol, water, and acetone were distilled off from the system by nitrogen bubbling. The resultant residue was neutralized with 14.7 g of 10% by weight aqueous sodium hydroxide solution, and water was then added thereto. The water was removed at 110° C. and a pressure of −0.097 MPa (gauge pressure) or lower with nitrogen bubbling. Subsequently, 11.7 g each of Kyowaad 1000 and Kyowaad 700 (manufactured by Kyowa Chemical Industry Co., Ltd.) were added thereto to purify the residue at 90° C. and a pressure of −0.097 MPa (gauge pressure) or lower with nitrogen bubbling for 2 hours. The resultant mixture was filtered to obtain 252 g of the sugar-alcohol-modified organopolysiloxane represented by formula (15).

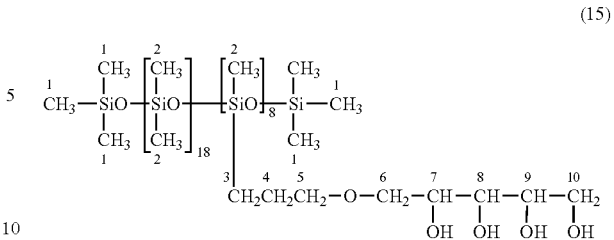

(15)

Assignment by $^{13}$C-NMR Spectroscopy (numerals in the parentheses indicate chemical shifts; unit, ppm)

$C_1$ (1.8), $C_2$ (1.0), $C_3$ (13.4), $C_4$ (23.0), $C_5$ (71.9), $C_6$ (71.6), $C_7$ (73.5), $C_8$ (73.9), $C_9$ (71.7), $C_{10}$ (64.1)

Example 2

Into a four-necked flask having a capacity of 5 L and equipped with a stirrer, nitrogen introduction tube, thermocouple, condenser, and oil/water separatory tube were introduced 1,400.0 g of xylitol, 2,678.4 g of 2,2-dimethoxypropane, and 53 mg of p-toluenesulfonic acid monohydrate. The atmosphere in the reaction system was replaced with nitrogen. Thereafter, the contents were held at 60 to 90° C. and reacted for 2 hours. After completion of the reaction, the methanol yielded as a by-product and the excess 2,2-dimethoxypropane were distilled off with heating at ordinary pressure in a nitrogen stream, and the distillate was passed through the condenser and the oil/water separatory tube and recovered after condensation. It was ascertained that the discharge of the distillate had stopped. Thereafter, by-products contained in a slight amount and the excess raw materials were removed at 80 to 100° C. and 10 mmHg (gauge pressure) for 1 hour to obtain 2,050.2 g of the diisopropylidenexylitol represented by formula (11). This compound was liquid at 10° C. and had a dynamic viscosity (25° C.) of 528.4 mm$^2$/s and a GC purity of 96%.

Subsequently, 1,400.0 g of the diisopropylidenexylitol obtained by the method described above, 497.2 g of sodium hydroxide, and 531.4 g of allyl chloride were introduced into an autoclave having a capacity of 5 L and equipped with a stirrer, nitrogen introduction tube, and thermocouple. The atmosphere in the system was replaced with nitrogen. Thereafter, the contents were heated to 100° C. with stirring and reacted for 3 hours. Water (1,994 g) was added thereto, and the resultant mixture was stirred for 10 minutes and then allowed to stand for 1 hour and separate into layers. The lower layer, which was water containing the alkali, was discharged. The remaining organic layer was dehydrated by nitrogen bubbling for 1 hour at 100° C. and a pressure of −0.097 MPa (gauge pressure) or lower. Subsequently, 84.6 g of Kyowaad 700 (manufactured by Kyowa Chemical Industry Co., Ltd.) was added thereto to conduct an adsorption treatment at 90° C. and a pressure of −0.097 MPa (gauge pressure) or lower for 2 hours with nitrogen bubbling. The resultant mixture was filtered to obtain 1,331.8 g of the diisopropylidenexylitol monoallyl ether represented by formula (12). This compound had a hydroxyl value of 19 KOH-mg/g, dynamic viscosity (25° C.) of 18 mm²/s, degree of unsaturation of 3.3 meq/g, and GC purity of 93%.

Subsequently, 1,200.0 g of the diisopropylidenexylitol monoallyl ether obtained by the method described above, 144.0 g of 10% by weight phosphoric acid, and 120 g of water were introduced into a four-necked flask having a capacity of 3 L and equipped with a stirrer, nitrogen introduction tube, thermocouple, and condenser. The contents were stirred at 80° C. in a closed state for 1 hour, and the water and acetone were distilled off from the system by nitrogen bubbling. The resultant residue was neutralized with 50.4 g of 10% by weight aqueous sodium hydroxide solution, and water was then added thereto. The water was removed at 100° C. and a pressure of −0.097 MPa (gauge pressure) or lower with nitrogen bubbling. Subsequently, 36.0 g of Kyowaad 1000 (manufactured by Kyowa Chemical Industry Co., Ltd.) was added thereto to conduct an adsorption treatment at 90° C. and a pressure of −0.097 MPa (gauge pressure) or lower for 1 hour with nitrogen bubbling. The resultant mixture was filtered to obtain 772.8 g of the xylitol monoallyl ether represented by formula (16). This compound had a hydroxyl value of 1,153 KOH-mg/g, dynamic viscosity (25° C.) of 12,314 mm²/s, and degree of unsaturation of 4.59 meq/g.

(16)

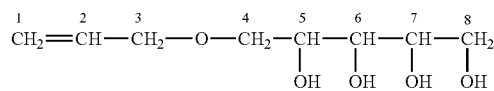

Assignment by ¹³C-NMR Spectroscopy (numerals in the parentheses indicate chemical shifts; unit, ppm)

$C_1$ (117.7), $C_2$ (137.0), $C_3$ (72.7), $C_4$ (71.8), $C_5$ (73.2), $C_6$ (74.0), $C_7$ (72.0), $C_8$ (64.1)

Subsequently, 200 g of the hydrogendimethylpolysiloxane represented by formula (13), 100 g of isopropyl alcohol, and 0.2 g of potassium acetate were introduced into a four-necked flask having a capacity of 1 L and equipped with a stirrer, nitrogen introduction tube, thermocouple, and condenser. Furthermore, an isopropyl alcohol solution of chloroplatinic acid hexahydrate ($1 \times 10^{-3}$ mol/L) was introduced thereinto as a catalyst in such an amount as to result in a concentration of 30 ppm in terms of platinum amount. While the contents were being stirred in a nitrogen atmosphere, a mixture of 213.4 g of the xylitol monoallyl ether represented by formula (16) obtained above and 200 g of isopropyl alcohol was added dropwise thereto. After completion of the dropwise addition, the resultant mixture was reacted while refluxing the isopropyl alcohol. In the course of the reaction, the reaction mixture was sampled, and an N/10 isopropyl alcohol solution of potassium hydroxide was added to the sample; the reaction was continued until the addition of the isopropyl alcohol solution came not to result in hydrogen gas evolution. The isopropyl alcohol was distilled off to obtain 369 g of the sugar-alcohol-modified organopolysiloxane represented by formula (15).

Example 3

Into a four-necked flask having a capacity of 1 L and equipped with a stirrer, nitrogen introduction tube, thermocouple, and condenser was introduced 200 g of the hydrogendimethylpolysiloxane represented by formula (13). An isopropyl alcohol solution of chloroplatinic acid hexahydrate ($1 \times 10^{-3}$ mol/L) was further introduced thereinto as a catalyst in such an amount as to result in a concentration of 30 ppm in terms of platinum amount. While the contents were being stirred in a nitrogen atmosphere, a mixture of 162.3 g of the diisopropylidenexylitol monoallyl ether represented by formula (12) obtained in Example 1 and 170.2 g of a polyoxyethylene allylmethyl ether (number of moles of EO added, 10.6 mol) was added dropwise thereto. The resultant mixture was reacted at 90° C. In the course of the reaction, 27.5 g of 1-octene was added. The reaction mixture was sampled, and an N/10 isopropyl alcohol solution of potassium hydroxide was added to the sample; the reaction was continued until the addition of the isopropyl alcohol solution came not to result in hydrogen gas evolution. The excess 1-octene added was distilled off to obtain 447 g of the sugar-alcohol- and polyoxyethylene-comodified organopolysiloxane precursor represented by formula (17).

(17)

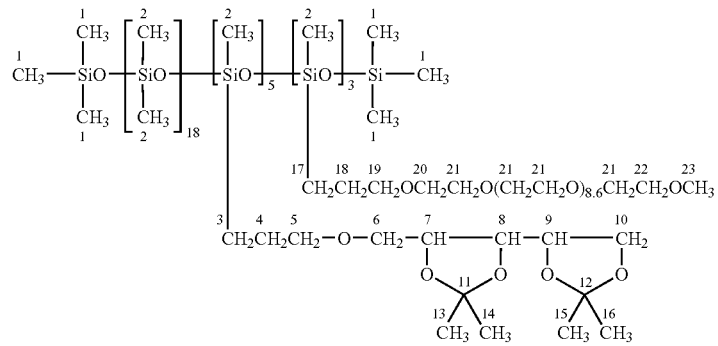

Assignment by $^{13}$C-NMR Spectroscopy (numerals in the parentheses indicate chemical shifts; unit, ppm)

$C_1$ (1.8), $C_2$ (1.0), $C_3$ (13.4), $C_4$ (23.0), $C_5$ (71.9), $C_6$ (71.4), $C_7$ (75.8), $C_8$ (78.7), $C_9$ (74.5), $C_{10}$ (65.7), $C_{11}$-$C_{12}$ (109.6, 109.7), $C_{13}$-$C_{16}$ (27.0, 27.0, 26.3, 25.5), $C_{17}$ (13.3), $C_{18}$ (23.0), $C_{19}$ (71.9), $C_{20}$ (70.0), $C_{21}$ (70.6), $C_{22}$ (71.9), $C_{23}$ (59.0)

Subsequently, 350.0 g of the sugar-alcohol- and polyoxyethylene-comodified organopolysiloxane precursor represented by formula (17) was introduced into a four-necked flask having a capacity of 1 L and equipped with a stirrer, nitrogen introduction tube, thermocouple, and condenser. Thereto were added 35 g of water, 42 g of 10% by weight phosphoric acid, and 140 g of isopropyl alcohol. The contents were stirred for 2 hours in a closed state while refluxing the isopropyl alcohol. Thereafter, the isopropyl alcohol, water, and acetone were distilled off from the system by nitrogen bubbling. The resultant residue was neutralized with 14.7 g of 10% by weight aqueous sodium hydroxide solution, and water was then added thereto. The water was removed at 110° C. and a pressure of –0.097 MPa (gauge pressure) or lower with nitrogen bubbling. Subsequently, 11.7 g each of Kyowaad 1000 and Kyowaad 700 (manufactured by Kyowa Chemical Industry Co., Ltd.) were added thereto to purify the residue at 90° C. and a pressure of –0.097 MPa (gauge pressure) or lower with nitrogen bubbling for 2 hours. The resultant mixture was filtered to obtain 263 g of the sugar-alcohol- and polyoxyethylene-comodified organopolysiloxane represented by formula (18).

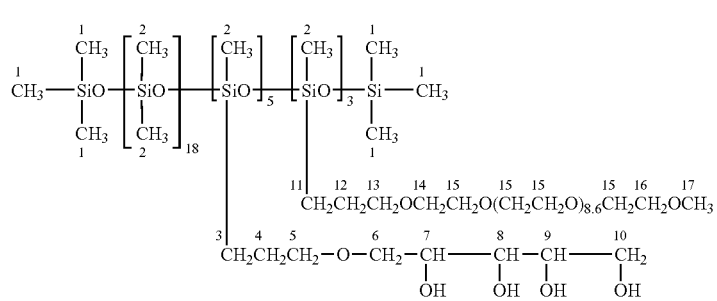

(18)

Assignment by $^{13}$C-NMR Spectroscopy (numerals in the parentheses indicate chemical shifts; unit, ppm)

$C_1$ (1.8), $C_2$ (1.0), $C_3$ (13.4), $C_4$ (23.0), $C_5$ (71.9), $C_6$ (71.6), $C_7$ (73.5), $C_8$ (73.9), $C_9$ (71.7), $C_{10}$ (64.1), $C_{11}$ (13.3), $C_{12}$ (23.0), $C_{13}$ (71.9), $C_{14}$ (70.0), $C_{15}$ (70.6), $C_{16}$ (71.9), $C_{17}$ (59.0)

Example 4

Into a four-necked flask having a capacity of 1 L and equipped with a stirrer, nitrogen introduction tube, thermocouple, and condenser were introduced 200 g of the hydrogendimethylpolysiloxane represented by formula (13), 135 g of isopropyl alcohol, and 0.2 g of potassium acetate. Furthermore, an isopropyl alcohol solution of chloroplatinic acid hexahydrate ($1 \times 10^{-3}$ mol/L) was introduced thereinto as a catalyst in such an amount as to result in a concentration of 35 ppm in terms of platinum amount. While the contents were being stirred in a nitrogen atmosphere, a mixture of 140.2 g of the xylitol monoallyl ether represented by formula (16) obtained in Example 2 and 113.2 g of a polyoxyethylene allylmethyl ether (number of moles of EO added, 10.6 mol) was added dropwise thereto. After completion of the dropwise addition, the resultant mixture was reacted while refluxing the isopropyl alcohol. In the course of the reaction, 27.5 g of 1-octene was added. The reaction mixture was sampled, and an N/10 isopropyl alcohol solution of potassium hydroxide was added to the sample; the reaction was continued until the addition of the isopropyl alcohol solution came not to result in hydrogen gas evolution. The isopropyl alcohol and the excess 1-octene added were distilled off to obtain 372 g of the sugar-alcohol- and polyoxyethylene-comodified organopolysiloxane represented by formula (19).

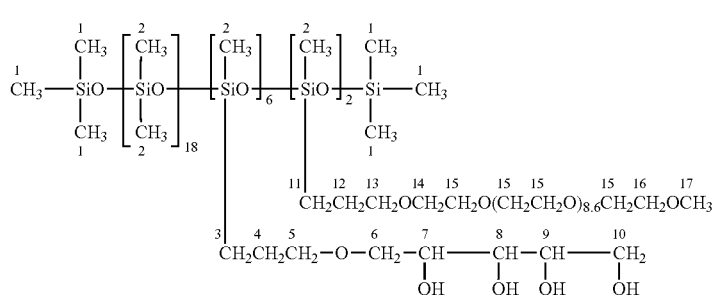

(19)

Assignment by $^{13}$C-NMR Spectroscopy (numerals in the parentheses indicate chemical shifts; unit, ppm)

$C_1$ (1.8), $C_2$ (1.0), $C_3$ (13.4), $C_4$ (23.0), $C_5$ (71.9), $C_6$ (71.6), $C_7$ (73.5), $C_8$ (73.9), $C_9$ (71.7), $C_{10}$ (64.1), $C_{11}$ (13.3), $C_{12}$ (23.0), $C_{13}$ (71.9), $C_{14}$ (70.0), $C_{15}$ (70.6), $C_{16}$ (71.9), $C_{17}$ (59.0)

Example 5

Into a four-necked flask having a capacity of 1 L and equipped with a stirrer, nitrogen introduction tube, thermocouple, and condenser were introduced 390 g of the hydrogendimethylpolysiloxane represented by formula (20) (HMS-082, manufactured by AZmax Co.), 140 g of isopropyl alcohol, and 0.2 g of potassium acetate. Furthermore, an isopropyl alcohol solution of chloroplatinic acid hexahydrate ($1\times10^{-3}$ mol/L) was introduced thereinto as a catalyst in such an amount as to result in a concentration of 30 ppm in terms of platinum amount. While the contents were being stirred in a nitrogen atmosphere, a mixture of 110 g of the xylitol monoallyl ether represented by formula (16) obtained in Example 2 and 110 g of isopropyl alcohol was added dropwise thereto. After completion of the dropwise addition, the resultant mixture was reacted while refluxing the isopropyl alcohol. In the course of the reaction, the reaction mixture was sampled, and an N/10 isopropyl alcohol solution of potassium hydroxide was added to the sample; the reaction was continued until the addition of the isopropyl alcohol solution came not to result in hydrogen gas evolution. The isopropyl alcohol was distilled off to obtain 431.6 g of the sugar-alcohol-modified organopolysiloxane represented by formula (21).

Assignment by $^{13}$C-NMR Spectroscopy (numerals in the parentheses indicate chemical shifts; unit, ppm)

$C_1$ (1.8), $C_2$ (1.0), $C_3$ (13.4), $C_4$ (23.0), $C_5$ (71.9), $C_6$ (71.6), $C_7$ (73.5), $C_8$ (73.9), $C_9$ (71.7), $C_{10}$ (64.1)

Example 6

Into a four-necked flask having a capacity of 1 L and equipped with a stirrer, nitrogen introduction tube, thermocouple, and condenser were introduced 100 g of pentamethyldisiloxane, 50 g of isopropyl alcohol, and 0.1 g of potassium acetate. Furthermore, an isopropyl alcohol solution of chloroplatinic acid hexahydrate ($1\times10^{-3}$ mol/L) was introduced thereinto as a catalyst in such an amount as to result in a concentration of 35 ppm in terms of platinum amount. While the contents were being stirred in a nitrogen atmosphere, a mixture of 155.0 g of the xylitol monoallyl ether represented by formula (16) obtained in Example 2 and 100 g of isopropyl alcohol was added dropwise thereto. After completion of the dropwise addition, the resultant mixture was reacted while refluxing the isopropyl alcohol. In the course of the reaction, 22.5 g of 1-octene was added. The reaction mixture was sampled, and an N/10 isopropyl alcohol solution of potassium hydroxide was added to the sample; the reaction was continued until the addition of the isopropyl alcohol solution came not to result in hydrogen gas evolution. The isopropyl alcohol and the excess 1-octene added were distilled off to obtain 218 g of the sugar-alcohol-modified organodisiloxane represented by formula (22).

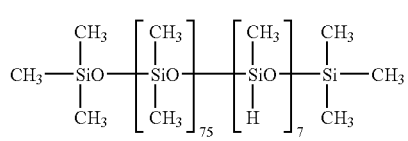

(20)

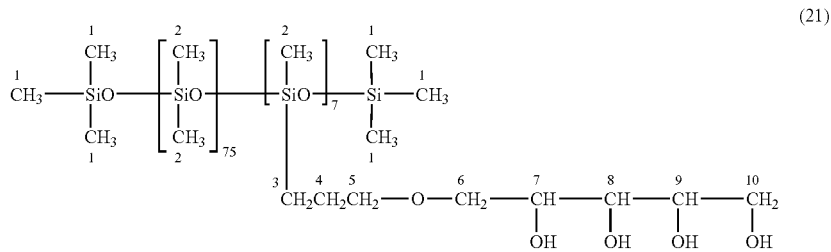

(21)

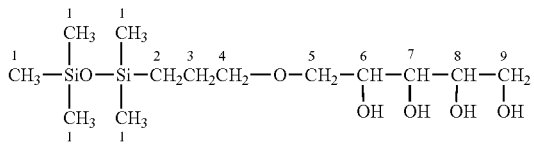

(22)

Assignment by $^{13}$C-NMR Spectroscopy (numerals in the parentheses indicate chemical shifts; unit, ppm)

$C_1$ (1.9), $C_2$ (13.3), $C_3$ (23.1), $C_4$ (71.8), $C_5$ (71.6), $C_6$ (73.5), $C_7$ (73.9), $C_8$ (71.7), $C_9$ (64.1)

Example 7

The sugar-alcohol-modified organopolysiloxane compound obtained in Example 5, a dimethylpolysiloxane having a viscosity at 25° C. of 0.1 Pa·s, and ion-exchanged water were used in proportions of 17% by weight, 33% by weight, and 50% by weight, respectively, to prepare an emulsion. The emulsion was prepared by introducing the sugar-alcohol-modified organopolysiloxane compound and the polydimethylsiloxane into a homomixer and then adding the ion-exchanged water thereto while mixing the polymers by means of the homomixer. The emulsion prepared was placed in 20-mL screw tubes and subjected to an emulsion stability test, in which the emulsion was stored for 1 week at ordinary temperature and at 50° C. and visually evaluated for emulsion stability. With respect to evaluation criteria, the case where no change, such as, e.g., separation, was visually observed in the emulsion was rated as ○, and the other cases were rated as x. For the purpose of comparison, the polyoxyalkylene-modified organopolysiloxane compound represented by formula (23) was used. This compound was synthesized under the same conditions as in the Examples.

Comparative Example 1

An emulsion was prepared in the same manner as in Example 7, except that the sugar-alcohol-modified organopolysiloxane compound used in Example 7 was replaced with the polyoxyalkylene-modified organopolysiloxane compound represented by formula (23).

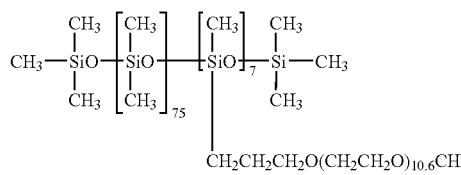

(23)

Furthermore, the emulsions were examined for viscosity (Pa·s) at 25° C. with a rheometer in the rotational-speed range of 1 to 300 rpm. The results thereof are shown in Table 1.

[Table 1]

TABLE 1

|  |  | Example 7 | Comparative Example 1 |
|---|---|---|---|
|  |  | Compound used | |
|  |  | Compound of Example 5 | Compound of formula (23) |
| Emulsion stability test | Just after emulsification | ○ | ○ |
|  | Ordinary temperature, after 1 week | ○ | ○ |
|  | 50° C., after 1 week | ○ | x (gelled) |
| Viscosity at each rotational speed (Pa·s) | 2 rpm | 38.2 | 0.6 |
|  | 5 rpm | 18.7 | 0.6 |
|  | 20 rpm | 7.2 | 0.2 |
|  | 50 rpm | 3.0 | 0.1 |
|  | 100 rpm | 2.0 | 0.07 |
|  | 300 rpm | 1.4 | 0.06 |

It was found from the results given above that the emulsion obtained in Example 7 had better emulsion stability and higher viscosities than the emulsion of Comparative Example 1. The emulsion of Example 7 was found to decrease in viscosity with increasing stirring speed, i.e., to have the so-called thixotropic properties. It is thought that such excellent properties were brought about because the compound of the invention had hydroxyl groups, which are hydrophilic, effectively imparted thereto. Consequently, the sugar-alcohol-modified organopolysiloxane compound of the invention can be obtained as a nonionic surfactant having surface-active properties with various excellent properties, by regulating the molecular weight of the hydrogenorganopolysiloxane and the number of Si—H groups contained therein. For example, the surfactant can be used in a wide range of applications including a cosmetic material having satisfactory emulsifiability and excellent in extensibility and spreadability and a coating material additive excellent in anti-sagging properties and leveling properties. Furthermore, xylitol, which may be used as a raw material for synthesis in the invention, is a plant-derived compound satisfactory in biodegradability, thermal stability, and storage stability. These properties, except for part thereof, can be imparted to the sugar-alcohol-modified organopolysiloxane compound of the invention. Consequently, the compound of the invention is exceedingly useful.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 30, 2007 (Application No. 2007-093789), the entire contents thereof being herein incorporated by reference.

All the references cited herein are incorporated as a whole.

The invention claimed is:

1. A precursor for a sugar-alcohol-modified organopolysiloxane represented by formula (1):

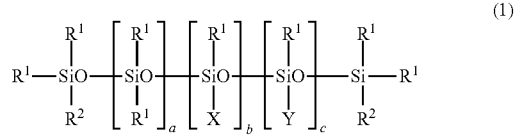

(1)

wherein $R^1$ represents a hydrocarbon group having from 1 to 8 carbon atoms; X is a group represented by formula (2); Y represents —$R^4$O(AO)n$R^5$ in which AO is an oxyalkylene group having from 2 to 4 carbon atoms, $R^4$ is a divalent hydrocarbon group having from 3 to 5 carbon atoms, $R^5$ is one of a hydrogen atom, a hydrocarbon group having from 1 to 24 carbon atoms and an acyl group having from 2 to 24 carbon atoms, and n is from 1 to 100; $R^2$ is one of $R^1$, X and Y; and a is from 0 to 700, b is from 0 to 100, and c is from 0 to 50; provided that when b is 0, at least one of the $R^2$s is X

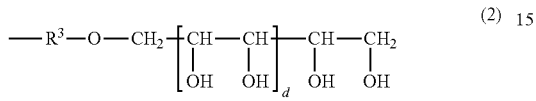
(2)

wherein $R^3$ is a divalent hydrocarbon group having from 3 to 5 carbon atoms; and d is from 1 to 2, the precursor being represented by formula (3):

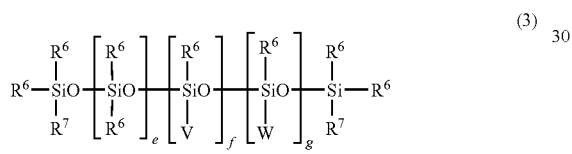
(3)

wherein $R^6$ represents a hydrocarbon group having from 1 to 8 carbon atoms; V is a group represented by formula (4); W represents —$R^{11}$O(AO)m$R^{12}$ in which AO is an oxyalkylene group having from 2 to 4 carbon atoms, $R^{11}$ is a divalent hydrocarbon group having from 3 to 5 carbon atoms, $R^{12}$ is one of a hydrogen atom, a hydrocarbon group having from 1 to 24 carbon atoms and an acyl group having from 2 to 24 carbon atoms, and m is from 1 to 100; $R^7$ is one of $R^6$, V and W; and e is from 0 to 700, f is from 0 to 100, and g is from 0 to 50; provided that when f is 0, at least one of the $R^7$s is V

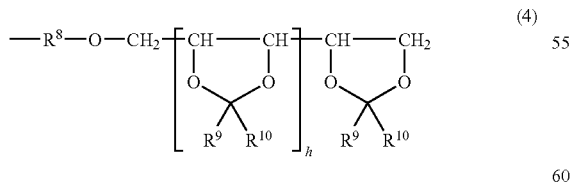
(4)

wherein $R^8$ is a divalent hydrocarbon group having from 3 to 5 carbon atoms; $R^9$ and $R^{10}$ each represent a hydrogen atom or an alkyl group having from 1 to 4 carbon atoms; and h is from 1 to 2; provided that at least one of the $R^9$s and the $R^{10}$ is an alkyl group having from 1 to 4 carbon atoms.

2. A process for producing a sugar-alcohol-modified organopolysiloxane compound represented by formula (1):

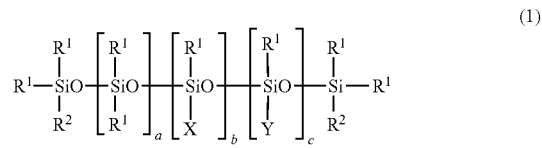
(1)

wherein $R^1$ represents a hydrocarbon group having from 1 to 8 carbon atoms; X is a group represented by formula (2); Y represents —$R^4$O(AO)n$R^5$ in which AO is an oxyalkylene group having from 2 to 4 carbon atoms, $R^4$ is a divalent hydrocarbon group having from 3 to 5 carbon atoms, $R^5$ is one of a hydrogen atom, a hydrocarbon group having from 1 to 24 carbon atoms and an acyl group having from 2 to 24 carbon atoms, and n is from 1 to 100; $R^2$ is one of $R^1$, X and Y; and a is from 0 to 700, b is from 0 to 100, and c is from 0 to 50; provided that when b is 0, at least one of the $R^e$s is X

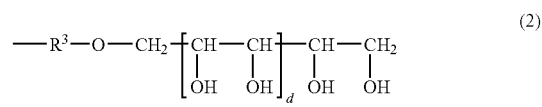
(2)

wherein $R^3$ is a divalent hydrocarbon group having from 3 to 5 carbon atoms; and d is from 1 to 2, said process comprising the following steps A to D:

A. a step in which a pentitol or a heptitol is subjected to a ketal formation reaction using a compound represented by formula (5) in an amount of from 1.2 to 1.5 times the theoretical equivalent and further using an acid catalyst in an amount of from $5 \times 10^{-6}$ to $5 \times 10^{-4}$% by mole based on the pentitol or heptitol;

B. a step in which the ketal compound obtained in the step A is reacted with an alkenyl halide having from 3 to 5 carbon atoms in the presence of an alkali catalyst and the resultant reaction product is purified with an acid or an adsorbent having an ability to adsorb alkalis;

C. a step in which the compound obtained in the step B is subjected to a hydrosilylation reaction using chloroplatinic acid as a catalyst to obtain a sugar-alcohol-modified organopolysiloxane precursor; and D. a step in which the compound obtained in the step C is hydrolyzed with an acid to obtain a sugar-alcohol-modified organopolysiloxane compound:

(5)

wherein $R^{13}$ and $R^{14}$ each represent a hydrogen atom or an alkyl group having from 1 to 4 carbon atoms, and $R^{15}$ and $R^{16}$ each represent an alkyl group having from 1 to 4 carbon atoms, provided that at least one of the $R^{13}$ and the $R^{14}$ is an alkyl group having from 1 to 4 carbon atoms.

3. A process for producing a sugar-alcohol-modified organopolysiloxane compound represented by formula (1):

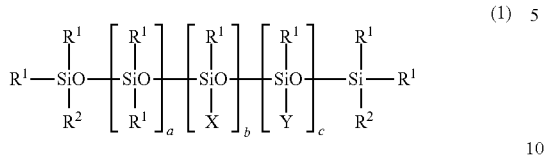

wherein $R^1$ represents a hydrocarbon group having from 1 to 8 carbon atoms; X is a group represented by formula (2); Y represents —$R^4$O(AO)n$R^5$ in which AO is an oxyalkylene group having from 2 to 4 carbon atoms, $R^4$ is a divalent hydrocarbon group having from 3 to 5 carbon atoms, $R^5$ is one of a hydrogen atom, a hydrocarbon group having from 1 to 24 carbon atoms and an acyl group having from 2 to 24 carbon atoms, and n is from 1 to 100; $R^2$ is one of $R^1$, X and Y; and a is from 0 to 700, b is from 0 to 100, and c is from 0 to 50; provided that when b is 0, at least one of the $R^2$s is X

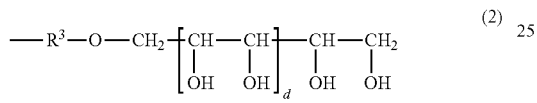

wherein $R^3$ is a divalent hydrocarbon group having from 3 to 5 carbon atoms; and d is from 1 to 2, said process comprising the following steps E to H:

E. a step in which a pentitol or heptitol is subjected to a ketal formation reaction using a compound represented by formula (5) in an amount of from 1.2 to 1.5 times the theoretical equivalent and further using an acid catalyst in an amount of from $5\times10^{-6}$ to $5\times10^{-4}$% by mole based on the pentitol or heptitol;

F. a step in which the ketal compound obtained in the step E is reacted with an alkenyl halide having from 3 to 5 carbon atoms in the presence of an alkali catalyst and the resultant reaction product is purified with an acid or an adsorbent having an ability to adsorb alkalis;

G. a step in which the compound obtained in the step F is hydrolyzed with an acid to obtain a pentitol monoalkenyl ether or heptitol monoalkenyl ether represented by formula (6)

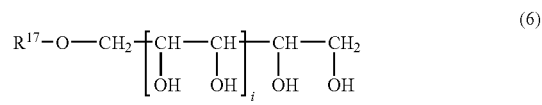

wherein $R^{17}$ represents an alkenyl group having from 3 to 5 carbon atoms, and i is from 1 to 2; and H. a step in which the compound obtained in the step G is subjected to a hydrosilylation reaction using chloroplatinic acid as a catalyst to obtain a sugar-alcohol-modified organopolysiloxane compound.

\* \* \* \* \*